United States Patent [19]

Ishiyama

[11] 4,437,732
[45] Mar. 20, 1984

[54] WIDE MAGNIFICATION-VARIABLE RANGE ZOOM LENS SYSTEM

[75] Inventor: Shozo Ishiyama, Haciioji, Japan

[73] Assignee: Konishirkou Photo Industry Co., Ltd., Tokyo, Japan

[21] Appl. No.: 269,769

[22] Filed: Jun. 3, 1981

[30] Foreign Application Priority Data

Jun. 5, 1980 [JP] Japan .................................. 55-74865

[51] Int. Cl.³ ............................................. G02B 15/14
[52] U.S. Cl. .................................................. 350/427
[58] Field of Search ........................ 350/423, 426, 427

[56] References Cited

U.S. PATENT DOCUMENTS 3,185,029 5/1965 Peck et al. ........................... 350/427

Primary Examiner—John K. Corbin
Assistant Examiner—Rebecca D. Gass

Attorney, Agent, or Firm—Jordan B. Bierman; Linda Bierman; C. Cornell Remsen, Jr.

[57] ABSTRACT

A wide magnification-variable range zoom lens system having a short total length and a small diameter permitting zooming from the wide angle to a long focal length comprises five lens groups having positive, negative, positive, negative and positive focal lengths respectively, a partial lens system consisting of said first and second lens group having a negative focal length over the entire zooming region, a partial lens system consisting of said third through fifth lens groups having a positive focal length, all of said lens groups moving along the optical axis to contribute to the variation of focal length of said zoom lens system, and said first lens group widely moving toward the object side when total focal length of the zoom lens system varies from the shortest to the longest.

5 Claims, 17 Drawing Figures

WIDE MAGNIFICATION-VARIABLE RANGE ZOOM LENS SYSTEM

BACKGROUND OF THE INVENTION

1. Field of the Invention

The present invention relates to a compact zoom lens system for 35 mm size still cameras, which permits a varying zooming ratio up to 3.5× to 5×, or magnification from a wide angle to a long focal length.

2. Description of the Prior Art

The conventional type of zoom lens systems were generally so composed as to allocate individual lens groups with functions of their own, for example, composed of a lens group arranged on the frontmost position for focusing, a second lens group arranged at the next position for varying magnification, a third lens group for compensation, and a lens group arranged at the rearmost position for imaging. When it is attempted to obtain a zoom lens system having a wide magnification range covering the wide position by means of such a composition, aberrations can hardly be corrected favorably without enlarging said lens system. It is because the lens group for varying magnification must have a short focal length in order to design said lens system compactly, thereby making it difficult to correct aberrations favorably over the entire zooming range.

Recently, however, various moving modes have been attempted to enhance the zooming ratio for zoom lens systems, permitting varying focal lengths from the wide position to a long length without allocating the individual lens components with the functions as described above. FIG. 1 through FIG. 4 show conventionally known moving modes in a zoom lens system comprising positive, negative, positive, negative and positive lens groups. In these drawings, the magnification varying lens group (V) designates the one whose imaging magnification is increased in absolute terms when the focal length of the lens system varies toward the tele position, taking the wide position as a standard.

Figure 1:
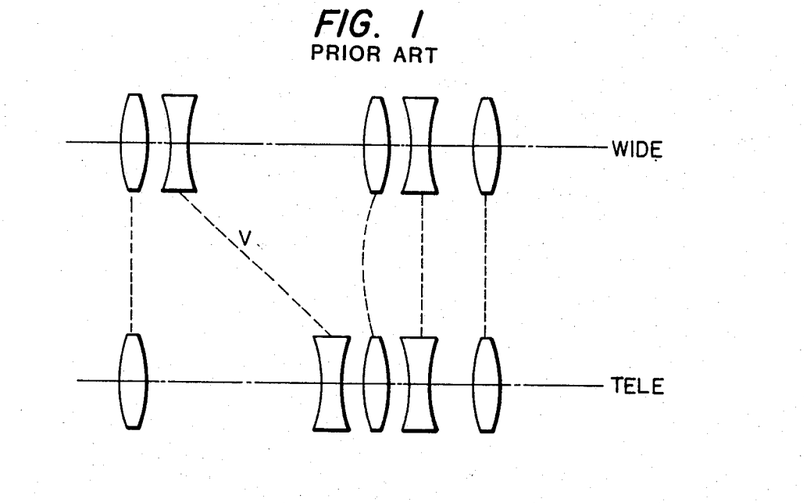
FIG. 1 through FIG. 4 show the conventionally known moving modes of the zoom lens systems comprising five lens groups.
Figure 2:
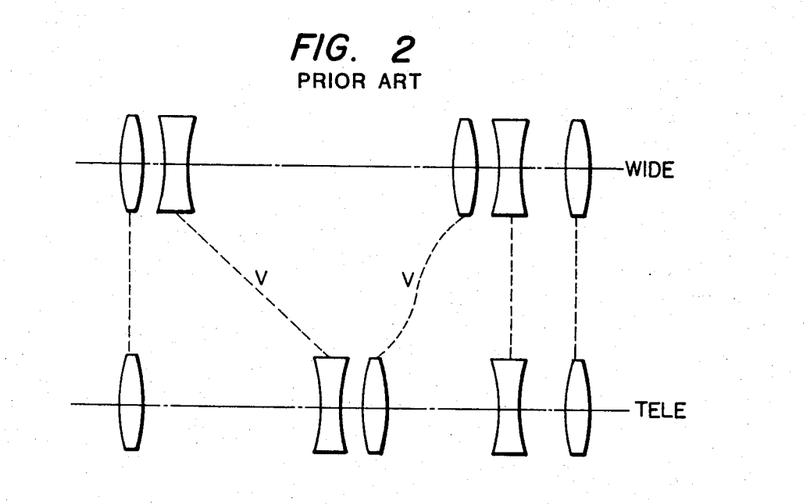

The lens system shown in FIG. 1 has the most ordinary type of composition among the conventional zoom lens systems described above, in which only the second lens component has the function of varying magnification, and the lens system is unavoidably enlarged when it is attempted to enhance its zooming ratio. The lens system shown in FIG. 2 is so designed as to give the magnification varying function to both the second and third lens group by establishing a certain definite relationship between focal lengths of these two lens groups, and therefore permits enhancing the magnification variation ratio. The zoom lens system illustrated in FIG. 3 comprises second, third and fourth lens groups having the function of varying magnification to permit enhancing the magnification variation ratio.

Figure 3:
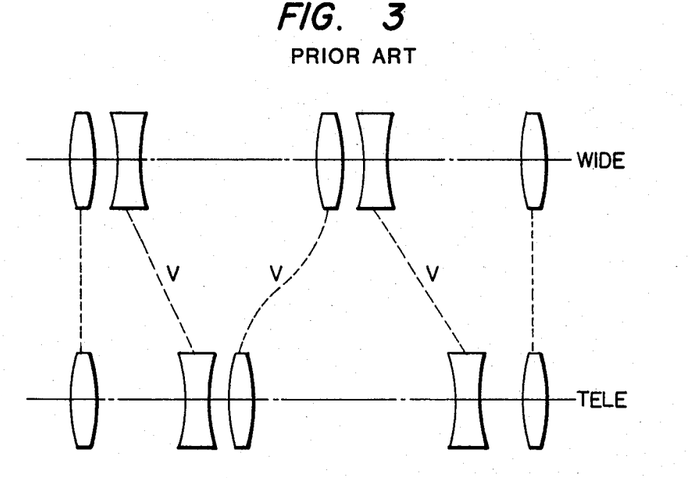
Figure 4:
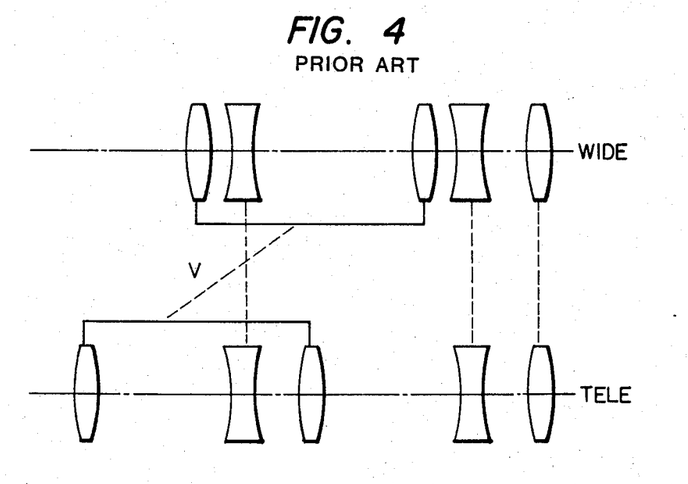

However, since the first lens group is fixed in the zoom lens system shown in FIG. 3, it must have a large diameter to allow a sufficient quantity of marginal rays to be incident at the wide position, thereby making it unavoidable to design it as a large lens system. The zoom lens system shown in FIG. 4 is so designed as to move its first and third lens groups as a unit for simplifying the mechanical construction for moving these groups, and can hardly result in enhancing the magnification variation ratio.

SUMMARY OF THE INVENTION

In view of the defects of the zoom lens systems comprising five lens groups described above, the present invention has succeeded in providing a compact, high performance zoom lens system permitting varying the magnification in a wide range from the wide position to the tele position by imparting the magnification varying function to a second lens group, a third lens group and a fifth lens group, moving a first lens group, distantly along with the variation of magnification and designing said lens system so as to have a total length at the wide position shorter than that at the tele position, thereby eliminating a conventional defect or the necessity of increasing the outside lens diameter at the wide position.

BRIEF DESCRIPTION OF THE DRAWINGS

FIGS. 12-1, 12-2 and FIGS. 13-1, 13-2 show graphs illustrating aberration characteristics of embodiments of the present invention.

DETAILED DESCRIPTION OF THE PREFERRED EMBODIMENTS

Figure 5:
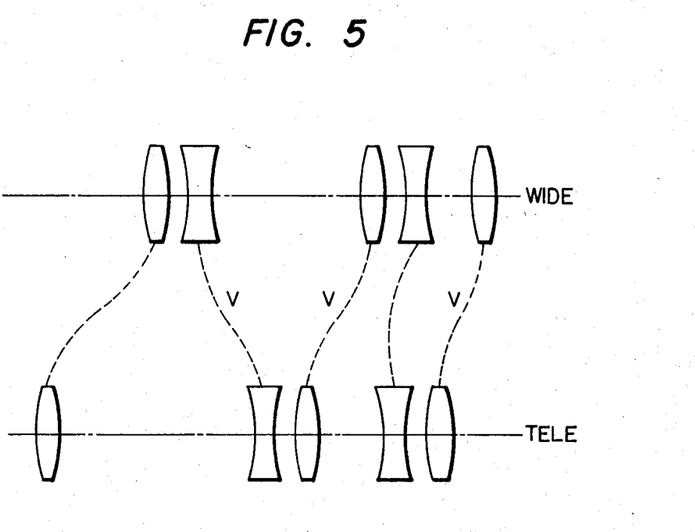
FIG. 5 shows moving a mode in the zoom lens system according to the present invention.

The zoom lens system according to the present invention comprises, as shown in FIG. 5, a first lens having positive focal length, a second lens group having negative focal length, a third lens group having positive focal length, a fourth lens group having negative focal length and a fifth lens group having a positive focal length, all characterized in that (1) a partial lens system consisting of said first and second lens groups has a negative focal length, and a partial lens system consisting of said third through fifth lens groups has a positive focal length over the entire variation range of focal length of the zoom lens system as a whole. In addition, (2) while focal length of the zoom lens system varies from the shortest to the longest, said first lens group is moved widely toward the object side so as to accelerate the increase of the imaging magnification of said second lens component; (3) said second and third lens groups are moved to increase the imaging magnification of these lens components respectively; (4) said fourth lens group is moved to accelerate increase of the imaging magnification of the partial lens system consisting of said third through fifth lens groups; and (5) said fifth lens group is moved to increase the imaging magnification of its own. (6) The zoom lens system according to the present invention is so designed as to satisfy the following conditions:

$dT_{1,2}(f)/df > 0$ $dT_{2,3}(f)/df < 0$ $$dT_{3,4}(f)/df > 0$$

$$dT_{4,5}(f)/df < 0$$

wherein the reference symbols are defined as follows:
  f: focal length of the zoom lens system as a whole
  Tij(f): airspace reserved between ith lens group and jth lens group when the zoom lens system has focal length f as a whole
  dTij(f)/df: variation ratio relative to f of Tij(f).

Since the distance as measured from the final lens surface to the film surface must be longer than a certain limit in a zoom lens system for single-lens reflex cameras, it is necessary to adopt the retrofocus type of lens arrangement at its wide position.

For this purpose, the above-mentioned condition (1) realizes the retrofocus type of lens arrangement by defining a negative focal length and a positive focal length for the partial lens system consisting of said first and second lens groups, and the partial lens system consisting of said third through the fifth lens groups respectively. This is significance of the above-mentioned condition (1).

In the conventionally known lens group moving modes, a certain number of lens groups are fixed, thereby making it unavoidable to enlarge the zoom lens systems when it is attempted to enhance the magnification variation ratio. In contrast, the zoom lens system according to the present invention has achieved the enhancement of the high magnification level without remarkably shortening focal lengths of the individual lens groups or enlarging the zoom lens system as a whole by moving all its lens components as defined by the conditions (2) through (5).

Moving the first lens group as defined by the condition (2) gives an effect, in relative relationship with the second lens group, equivalent to that obtained by increasing the moving distance of the second lens component, and therefore increases the imaging magnification of the second lens group.

The condition (3) defines movements of the second and third lens groups in the same modes as the conventional modes which are shown in FIG. 2 and FIG. 3.

The conditions (4) and (5) define such moving modes that the fourth lens group is arranged close to the third lens group at the wide position of the zoom lens system, whereas the fourth lens group is moved close to the fifth lens group at the tele position of the zoom lens system, whereby the principal point of the partial lens system consisting of the third through fifth lens groups is moved largely from the image side to the object side exceeding the moving distances of the individual lens groups so as to increase variation of the imaging magnification of this partial lens system.

The condition (6) relates to variation modes of the airspaces reserved between the individual lens groups which are caused along with the variation of focal length of the zoom lens system as a whole. When the zoom lens system is moved from the wide position to the tele position to vary its magnification, the airspace reserved between the first and second lens groups and that reserved between the third and fourth lens groups are increased, whereas the airspace reserved between the second and third lens groups and that reserved between the fourth and fifth lens groups are reduced.

The zoom lens system according to the present invention satisfying the above-mentioned conditions, should desirably satisfy the following additional conditions:

| | | | |
|---|---|---|---|
| $0.7f_T <$ | $f_1$ | $< 1.2f_T$ | (7) |
| $0.5f_W <$ | $|f_2|$ | $< 1.3f_W$ | (8) |
| $0.6f_W <$ | $f_3$ | $< 1.4f_W$ | (9) |
| $0.5f_W <$ | $|f_4|$ | $< 1.3f_W$ | (10) |
| $f_W <$ | $f_5$ | $< 1.7f_W$ | (11) |
| $0.8\sqrt{v} <$ | $V_2$ | $< 1.3\sqrt{v}$ | (12) |
| $0.7\sqrt{v} <$ | $V_{3,4,5}$ | $< 1.2\sqrt{v}$ | (13) | wherein the reference symbols are defined as follows:
  $f_i$: focal length of the ith lens group
  $f_W$: focal length of the zoom lens system as a whole at its wide position
  $f_T$: focal length of the zoom lens system as a whole at its tele position
  $V$: zooming ratio ($= f_T/f_W$)
  $V_2$: ratio of imaging magnification of the second lens group between the tele position and wide position.
  $V_{3\,4\,5}$: ratio of imaging magnification of the partial lens system consisting of the third through fifth lens groups between the tele position and wide position.

The conditions (7) through (11) define focal lengths of the individual lens groups which are necessary to maintain favorable performance without enlarging the zoom lens system as a whole.

If $f_1$ exceeds the upper limit of the condition (7), the lens system will be made larger and remarkable distortion will be produced around the tele position. If $f_1$ is smaller than the lower limit of the condition (7), high order spherical aberration will be undercorrected around the tele position.

If $|f_2|$ exceeds the upper limit of the condition (8), the lens system will unavoidably be enlarged and, in addition, there will be a great difference between the spherical aberration around the wide position and that around the tele position. If $|f_2|$ is smaller than the lower limit of the condition (8), in contrast, distortion will be greatly undercorrected around the wide position.

If $f_3$ exceeds the upper limit of the condition (9), the lens system will unavoidably be enlarged. If $f_3$ is smaller than the lower limit of the condition (9), coma will be produced and, in addition, distortion will be undercorrected around the wide position.

If $f_4$ exceeds the upper limit of the condition (10), the lens system will unavoidably be enlarged. If $f_4$ is smaller than the lower limit of the condition (10), in contrast, asymmetrical coma will be produced and, in addition, distortion will be undercorrected around the wide position.

If $f_5$ exceeds the upper limit of the condition (11), the fifth lens group must be moved for a long distance, thereby unavoidably enlarging the zoom lens system as a whole and, in addition, distortion will be overcorrected around the tele position. If $f_5$ is smaller than the lower limit of the condition (11), in contrast, a greatly asymmetrical coma will be produced and, in addition, distortion will be undercorrected around the wide position.

The conditions (12) and (13) are adopted for correcting aberrations favorably without enlarging the zoom lens system as a whole by distributing the zooming ratio adequately among the individual lens groups. So long as the zooming ratio of the entire lens system is kept constant, $V_{3,4,5}$ becomes larger as $V_2$ has a smaller value, and vice versa. It is therefore impossible that the upper or lower limits of both the conditions are exceeded at the same time. When $V_2$ exceeds the upper limit of the condition (12) and $V_{3,4,5}$ is smaller than the lower limit of the condition (13), the first and second lens groups require a long moving distance, whereas the third through fifth lens groups require a shorter moving distance. In order to afford a long moving distance for the first and second lens groups, the zoom lens system is unavoidably enlarged since it must have a large outside diameter at its tele position, and in addition, the difference will be large between distortion around the wide position and that around the tele position.

If $V_2$ is smaller than the lower limit of the condition (12) and $V_{3,4,5}$ exceeds the upper limit of the condition (13), in contrast, the first and second lens groups require a shorter moving distance, whereas the third through fifth lens groups require a longer moving distance. When moving distances are shorter for the first and second lens groups, the airspace reserved between the first and second lens groups is not widened around the tele position, the paraxial rays are incident on the second lens group at a high position apart from the optical axis and pass through the subsequent lens groups at high positions apart from the optical axis, thereby producing remarkably undercorrected spherical aberration which can not be corrected favorably.

Speaking specifically of the zoom lens system according to the present invention so designed as to satisfy the basic conditions described above, it consists of a first lens group comprising at least one positive lens component which is a doublet consisting of a positive lens element and a negative lens element, a second lens group comprising two negative lens components and a positive lens component, a third lens group comprising at least two positive lens components one of which is a doublet consisting of a positive lens element and a negative lens element, a fourth lens group comprising at least two negative lens components one of which is a doublet consisting of a positive lens element and a negative lens element, and a fifth lens group comprising at least two positive lens components at least one of which is a doublet consisting of a positive lens element and a negative lens element, and should desirably the following additional conditions:

| | |
|---|---|
| $1.7 < N_{p2}$ | (14) |
| $1.7 < N_{N2}$ | (15) |
| $40 < \nu_{N2}$ | (16) |
| $N_{P3} < 1.6$ | (17) |
| $50 < \nu_{P3}$ | (18) |
| $1.7 < N_{N4}$ | (19) |
| $40 < \nu_{N4}$ | (20) | wherein the reference symbols are defined as follows:

$N_{pi}$: mean value of refractive indices of the positive lens elements arranged in the ith lens group $N_{Ni}$: mean value of refractive indices of the negative lens elements arranged in the ith lens group $\nu_{Pi}$: mean value of Abbe's numbers of the positive lens elements arranged in the ith lens group $\nu_{Ni}$: mean value of abbe's numbers of the negative lens elements arranged in the ith lens group The condition (14) is necessary for correcting spherical aberration around the tele position of the zoom lens system. If $N_{P2}$ is smaller than 1.7, the positive lens functioning to undercorrect spherical aberration in the second lens group has a large curvature, thereby producing a greatly undercorrected high order spherical aberration around the tele position of the zoom lens system.

The condition (15) is required for maintaining Petzval's sum of the entire lens system at an adequate value, and correcting spherical aberration and distortion around the wide position of the zoom lens system. If $N_{N2}$ is smaller than 1.7, the diverging surfaces in the second lens group will have large curvatures to make Petzval's sum of the entire lens system too small, thereby aggravating sagital image plane curvature around the wide position and producing greatly overcorrected high order spherical aberration as well as greatly undercorrected distortion.

The condition (16) is necessary for correcting chromatic aberration in the entire zoom lens system. Since the second lens group is allocated with a function to increase magnification varying ratio in the zoom lens system according to the present invention, it is difficult to correct chromatic aberration in the entire lens system unless chromatic aberration is corrected in the second lens group considered independently. Chromatic aberration in the second lens group itself can be corrected favorably by designing the negative lenses in the second lens group so as to have a mean value of Abbe's numbers larger than 40.

The condition (17) is required to maintain Petzval's sum of the entire zoom lens system at an adequate value. If $N_{P3}$ exceeds the upper limit of the condition (17), the entire zoom lens system will have too small a Petzval's sum, thereby aggravating sagital image plane curvature around the wide position.

The condition (18) is required for correcting chromatic aberration in the entire zoom lens system. Since an important function to increase magnification variation is imparted not only to the second lens group but to the third lens group, it is difficult to correct chromatic aberration in the entire zoom lens system if chromatic aberration is not corrected in the third lens group considered alone.

Chromatic aberration can be corrected in the third lens group itself by increasing a mean value of Abbe's numbers of the positive lenses arranged in the third lens group above 50.

The condition (19) is necessary to maintain Petzval's sum of the entire zoom lens system at an adequate value. If $N_{N4}$ is smaller than 1.7, the entire zoom lens system will have too small a Petzval's sum, thereby aggravating sagital image plane curvature around the wide position.

The condition (20) is necessary to correct chromatic aberration in the entire zoom lens system. Since the fourth lens group also has the function to increase magnification variation, it is difficult to correct chromatic aberration in the entire zoom lens system so far as chromatic aberration is not corrected in the fourth lens group considered alone. Chromatic aberration in the fourth lens group can be corrected by selecting a mean value of Abbe's numbers of the negative lenses above 40.

Numerical data of some preferred embodiments of the present invention satisfying all the above-mentioned conditions will be summarized in the following tables, wherein the reference symbol R represents radius of curvature on the lens surface, the reference symbol D designates the airspace reserved between lens surfaces, the reference symbol $n_d$ denotes the refractive index for the d line, and the reference symbol $\nu$ represents the Abbe's number.

Embodiment 1

$f = 28.969 \sim 131.863$   F number $4.00 \sim 4.62$
Field angle $2W = 18°6' \sim 75°32'$

| Dwg. No. | | R | D | nd | ν |
|---|---|---|---|---|---|
| 1 | | 154.085 | 2.00 | 1.80518 | 25.4 |
| 2 | 1st lens | 71.160 | 7.00 | 1.62299 | 58.2 |
| 3 | group | −408.750 | 0.10 | | |
| 4 | | 50.885 | 4.50 | 1.62299 | 58.2 |
| 5 | | 82.750 | variable | | |
| 6 | | 133.870 | 1.20 | 1.77250 | 49.6 |
| 7 | | 17.125 | 6.44 | | |
| 8 | 2nd lens | −119.741 | 2.50 | 1.80518 | 25.4 |
| 9 | group | −37.040 | 1.00 | 1.77250 | 49.6 |
| 10 | | 73.977 | 0.10 | | |
| 11 | | 27.602 | 2.20 | 1.80518 | 25.4 |
| 12 | | 39.973 | variable | | |
| 13 | 3rd lens | 65.439 | 4.75 | 1.58913 | 61.1 |
| 14 | group | −20.400 | 1.00 | 1.80518 | 25.4 |
| 15 | | −29.765 | 0.10 | | |
| 16 | | 21.416 | 3.46 | 1.51633 | 64.1 |
| 17 | | 65.918 | variable | | |
| 18 | | 119.573 | 3.76 | 1.71736 | 29.5 |
| 19 | 4th lens | −17.128 | 1.00 | 1.77250 | 49.6 |
| 20 | group | 41.633 | 1.49 | | |
| 21 | | −34.680 | 1.00 | 1.77250 | 49.6 |
| 22 | | 140.021 | variable | | |
| 23 | | −129.801 | 4.95 | 1.71300 | 53.9 |
| 24 | | −16.485 | 1.00 | 1.80518 | 25.4 |
| 25 | 5th lens | −27.188 | 0.30 | | |
| 26 | group | −97.088 | 1.00 | 1.80610 | 40.9 |
| 27 | | 24.597 | 7.50 | 1.58913 | 61.1 |
| 28 | | −45.921 | 0.30 | | |
| 29 | | 42.314 | 4.16 | 1.51633 | 64.1 |
| 30 | | 312.792 | | | |

$f_1 = 109.328$  $f_2 = -20.510$  $f_3 = 23.972$  $f_4 = -22.936$  $f_5 = 39.603$

| Focal length | Back focus | F.NO. | $D_5$ | $D_{12}$ | $D_{17}$ | $D_{22}$ |
|---|---|---|---|---|---|---|
| 28.969 | 56.044 | 4.00 | 1.880 | 28.120 | 1.124 | 8.697 |
| 46.025 | 63.499 | 4.10 | 14.039 | 17.691 | 3.114 | 6.707 |
| 62.973 | 68.351 | 4.25 | 23.297 | 12.765 | 4.434 | 5.387 |
| 85.114 | 72.333 | 4.50 | 32.385 | 8.879 | 5.644 | 4.177 |
| 131.863 | 72.799 | 4.62 | 46.113 | 3.870 | 7.384 | 2.437 |

$v = 4.552$   $v_2 = 2.314 = 1.084\sqrt{v}$   $v_{3,4,5} = 1.968 = 0.922\sqrt{v}$

Embodiment 2

$f = 28.888 \sim 132.276$   F number $4.00 \sim 4.50$
Field angle $2W = 18°28' \sim 76°4'$

| Dwg. No. | | R | D | nd | ν |
|---|---|---|---|---|---|
| 1 | | 116.691 | 2.00 | 1.80518 | 25.4 |
| 2 | 1st lens | 61.756 | 7.60 | 1.62299 | 58.2 |
| 3 | group | 2363.005 | 0.10 | | |
| 4 | | 52.223 | 4.50 | 1.62299 | 58.2 |
| 5 | | 83.794 | variable | | |
| 6 | | 88.470 | 1.20 | 1.77250 | 49.6 |
| 7 | | 19.354 | 6.55 | | |
| 8 | 2nd lens | −94.460 | 2.80 | 1.80518 | 25.4 |
| 9 | group | −35.285 | 1.20 | 1.77250 | 49.6 |
| 10 | | 87.810 | 0.20 | | |
| 11 | | 33.119 | 2.40 | 1.80518 | 25.4 |
| 12 | | 40.708 | variable | | |
| 13 | | 55.135 | 4.00 | 1.58913 | 61.1 |
| 14 | 3rd lens | −36.777 | 1.00 | 1.80518 | 25.4 |
| 15 | group | −45.243 | 0.10 | | |
| 16 | | 25.142 | 3.80 | 1.51633 | 64.1 |
| 17 | | 756.094 | variable | | |
| 18 | | 458.443 | 3.00 | 1.71736 | 29.5 |
| 19 | 4th lens | −21.726 | 1.00 | 1.77250 | 49.6 |
| 20 | group | 54.509 | 1.25 | | |
| 21 | | −38.471 | 1.00 | 1.77250 | 49.6 |
| 22 | | 88.589 | variable | | |
| 23 | | −81.678 | 5.00 | 1.71300 | 53.9 |
| 24 | | −16.168 | 1.00 | 1.80518 | 25.4 |
| 25 | 5th lens | −27.256 | 0.10 | | |
| 26 | group | −1253.462 | 1.00 | 1.80610 | 40.9 |
| 27 | | 24.851 | 7.00 | 1.58913 | 61.1 |
| 28 | | −66.642 | 0.10 | | |
| 29 | | 41.868 | 7.00 | 1.51633 | 64.1 |
| 30 | | 213.165 | | | |

$f_1 = 118.951$  $f_2 = -21.765$  $f_3 = 24.079$  $f_4 = -22.440$  $f_5 = 39.504$

| Focal length | Back focus | F.NO. | $D_5$ | $D_{12}$ | $D_{17}$ | $D_{22}$ |
|---|---|---|---|---|---|---|
| 28.888 | 53.405 | 4.0 | 1.886 | 31.642 | 1.786 | 9.972 |
| 42.273 | 60.814 | 4.2 | 11.000 | 21.500 | 3.100 | 8.000 |
| 62.968 | 67.125 | 4.3 | 23.000 | 14.500 | 4.800 | 6.000 |
| 89.892 | 69.814 | 4.5 | 35.000 | 10.000 | 6.500 | 4.000 |
| 132.276 | 68.215 | 4.5 | 47.124 | 5.256 | 8.988 | 1.589 |

Figure 6:
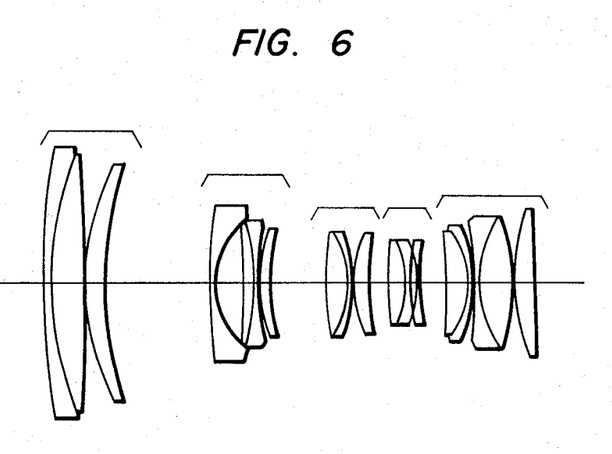
FIG. 6 and FIG. 8 show sectional views illustrating the composition of the zoom lens system according to the present invention.
Figure 7:
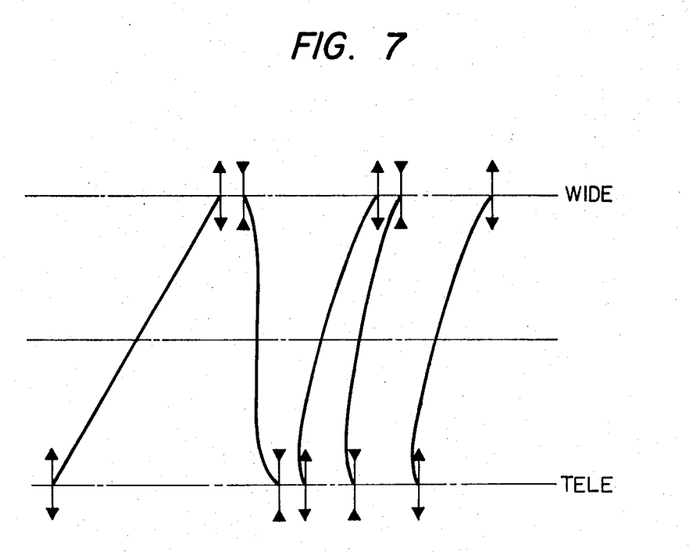
FIG. 7 and FIG. 9 show diagrams illustrating loci of the individual lens group.
Figure 8:
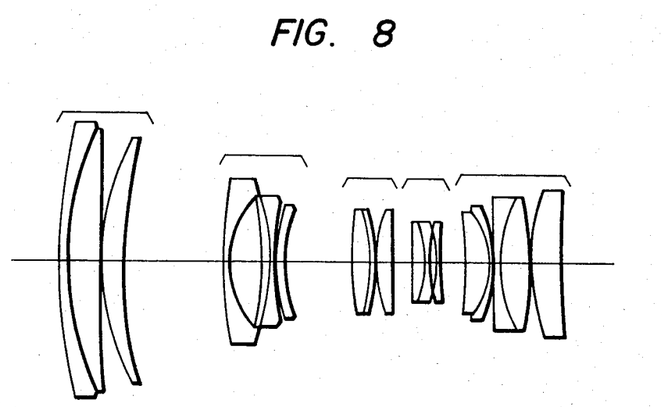
Figure 9:
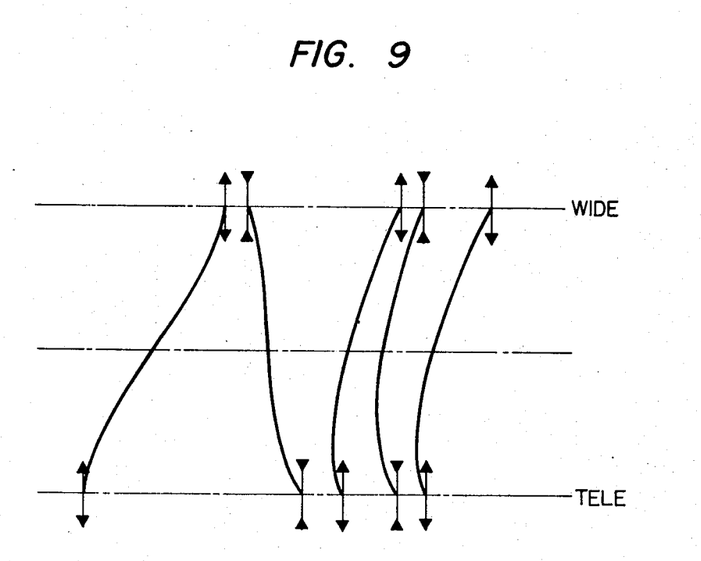
Figure 10A:
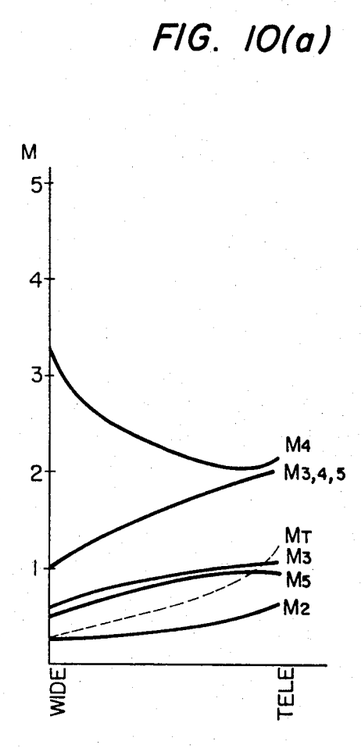
FIGS. 10(a), 10(b) and FIGS. 11(a), 11(b) show curves illustrating variation of imaging magnification of the individual lens group in embodiments of the present invention.
Figure 10B:
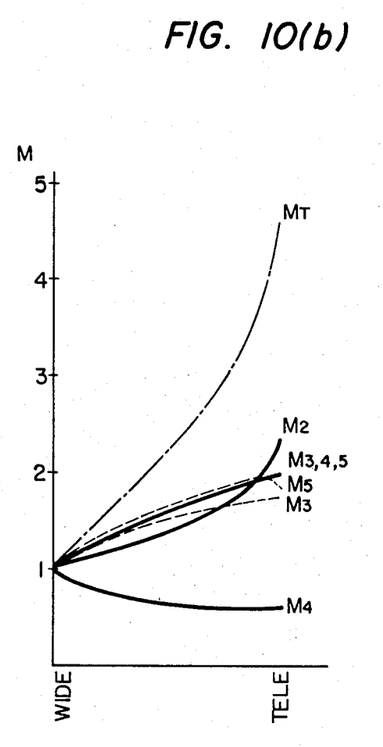
Figure 11A:
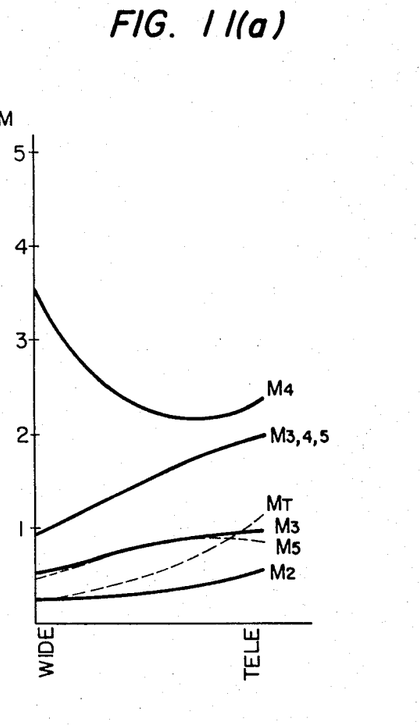
Figure 11B:
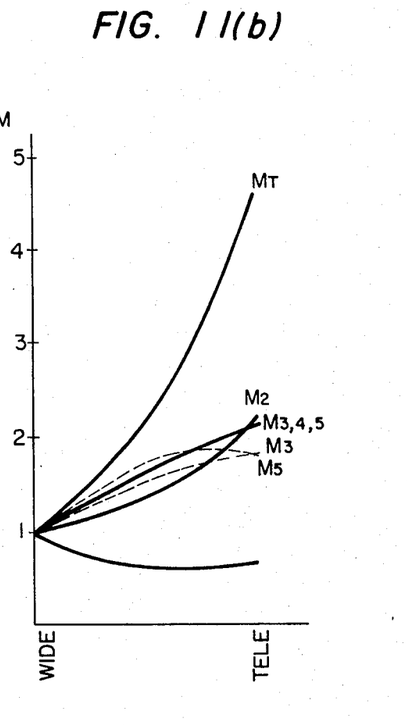
Figure 121:
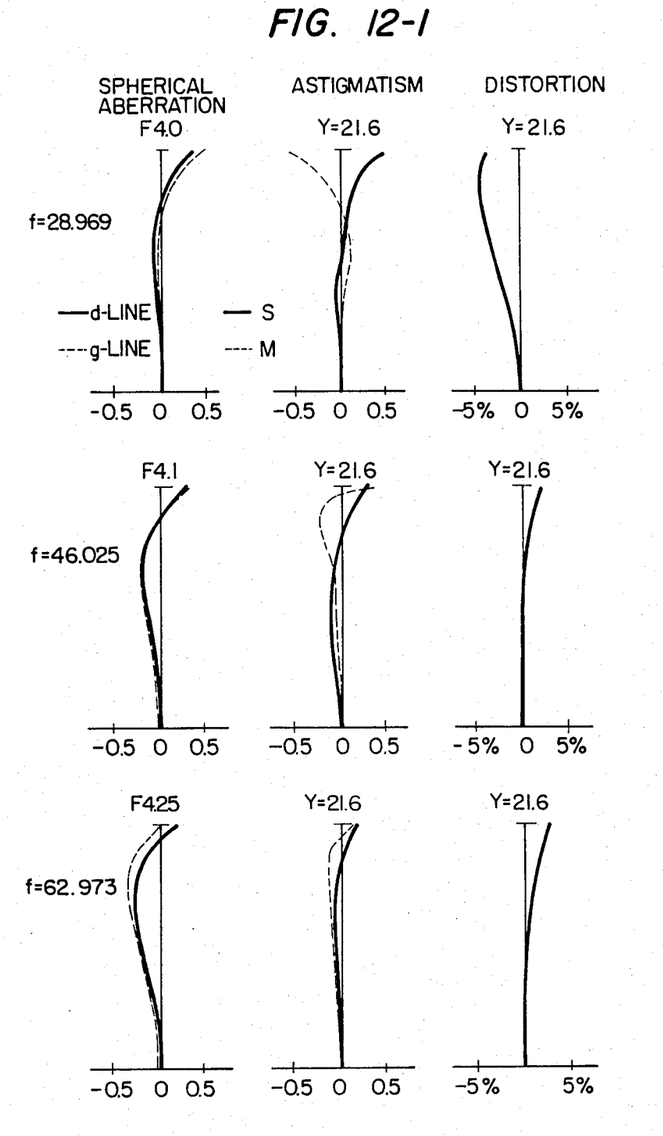
Figure 122:
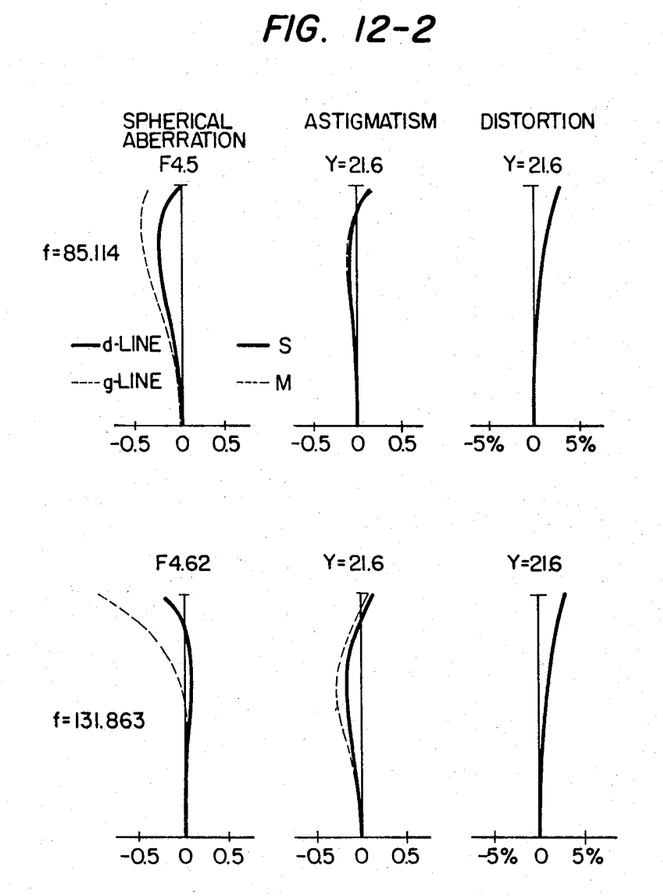
Figure 131:
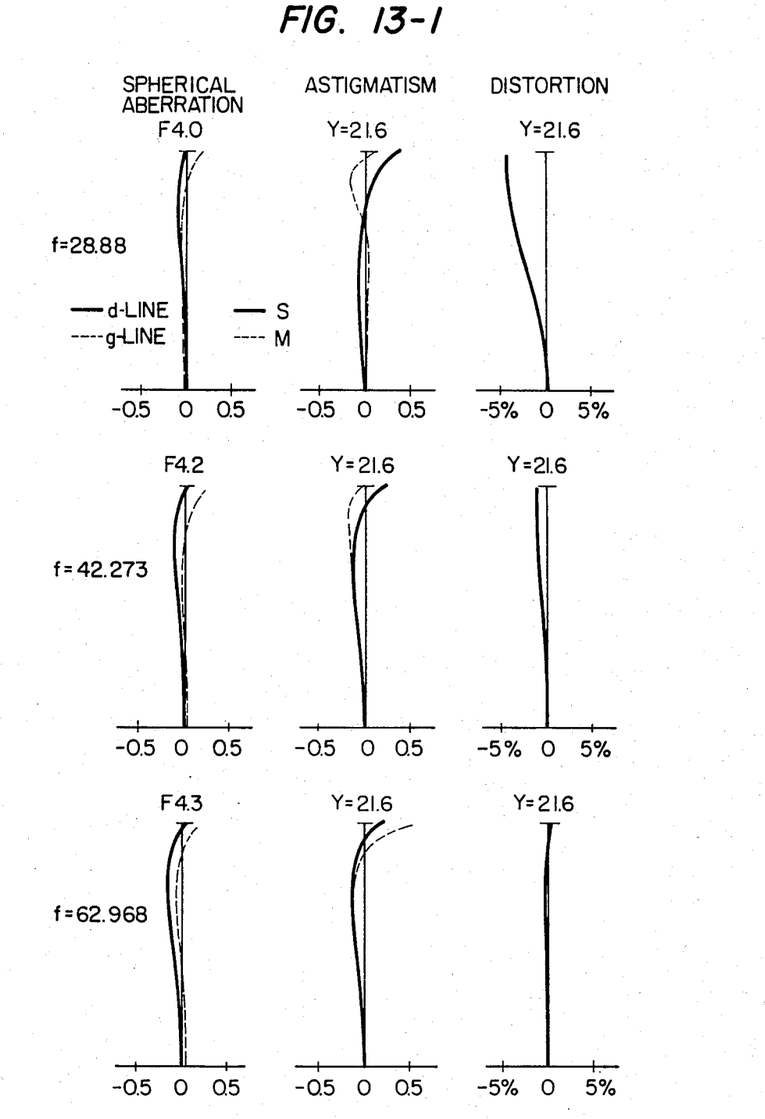
Figure 132:
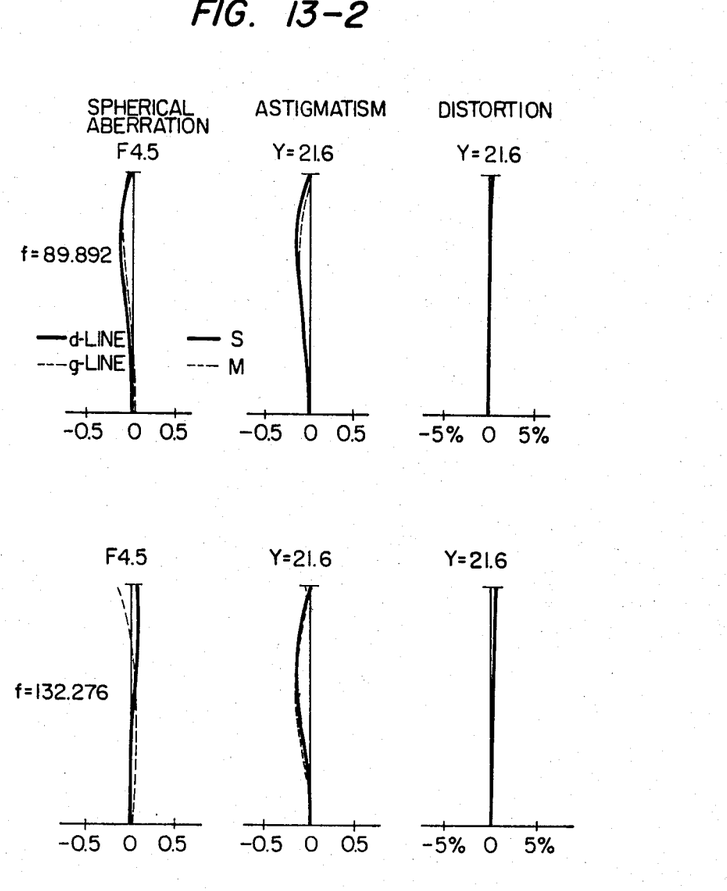

$v = 4.579$   $v_2 = 2.171 = 1.014\sqrt{v}$   $v_{3,4,5} = 2.109 = 0.986\sqrt{v}$ With reference to this embodiment, a sectional view illustrating its composition is shown in FIGS. 6, 8, moving loci of the individual lens groups are shown in FIGS. 7, 9, variations of imaging magnification levels are shown in FIGS. 10(a), 10(b), 11(a), 11(b) and aberration characteristic curves are visualized in FIGS. 12-1, 12-2, 13-1, 13-2. In FIGS. 10(a), 10(b), 11(a), 11(b), the reference symbols $M_2$, $M_3$, $M_4$ and $M_5$ represent imaging magnification levels of the second, third, fourth and fifth lens groups respectively, and the reference symbol $M_{3\,4\,5}$ designates imaging magnification level of the partial system consisting of the third through fifth lens groups. FIGS. 10(a), 11(a) illustrate variation of imaging magnification itself, whereas FIGS. 10(b), 11(b) visualize relative variation of imaging magnification taking the imaging magnification at the wide position as 1.

I claim:

1. In a zoom lens system comprising a first lens group having a positive focal length, a second lens group having a negative focal length, a third lens group having a positive focal length, a fourth lens group having a negative focal length and a fifth lens group having a positive focal length in the order from the object side, a wide magnification-variable range zoom lens system characterized in that over the entire range of focal length:

a partial lens system consisting of said first and second lens groups has a negative focal length and another partial lens system consisting of said third through fifth lens groups has a positive focal length;

when focal length of the entire zoom lens system is varied from the shortest to the longest length, said first lens group is moved toward the object side to accelerate increase of imaging magnification of said second lens group;

said second and third lens groups are moved in the direction to increase imaging magnification levels of their own;

said fourth lens group is moved to accelerate increase of the imaging magnification level of said partial lens system consisting of said third through fifth lens groups;

said fifth lens group is moved in the direction to increase the imaging magnification level of its own; and the airspaces reserved between the individual lens groups satisfy the following conditions:

$dT_{1,2}(f)/df > 0$ $dT_{2,3}(f)/df < 0$ $dT_{3,4}(f)/df > 0$ $dT_{4,5}(f)/df < 0$ wherein the reference symbols are defined as follows:
f: focal length of the entire zoom lens system
Tij(f): airspace reserved between the ith lens group and the jth lens group when the entire zoom lens system has a focal length f
dTij(f)/df: variation ratio of Tij(f) relative to f.

2. A wide magnification-variable range zoom lens system according to claim 1 satisfying the following conditions:

$$0.7f_t < f_1 < 1.2f_t$$
$$0.5f_w < |f_2| < 1.3f_w$$
$$0.6f_w < f_3 < 1.4f_w$$
$$0.5f_w < |f_4| < 1.3f_w$$
$$f_w < f_5 < 1.7f_w$$
$$0.8\sqrt{v} < V_2 < 1.3\sqrt{v}$$
$$0.7\sqrt{v} < V_{3,4,5} < 1.2\sqrt{v}$$

wherein the reference symbols are defined as follows:
fi: focal lengt of the ith lens group
$f_w$: focal length of the entire zoom lens system at its wide position
$f_t$: focal length of the entire zoom lens system at its tele position
V: zooming ration ($=f_t/f_w$)
$V_2$: imaging magnification ratio of the second lens group between the wide position and tele position
$V_{3\,4\,5}$: imaging magnification ratio of the partial lens system consisting of said third through fifth lens groups between the tele position and wide position.

3. A wide magnification-variable range zoom lens system according to claim 2 wherein said second lens group comprises at least two negative lens components and a positive lens component, said third lens group comprises at least two positive lens components one of which is a doublet consisting of a positive lens element and a negative lens element and, said fourth lens group comprises at least two negative lens components one of which is a doublet consisting of a positive lens element and a negative lens element, said zoom lens system satisfying the following conditions:

$$1.7 < N_{P2}$$
$$1.7 < N_{N2}$$
$$40 < v_{N2}$$
$$N_{P3} < 1.6$$
$$50 < v_{P3}$$
$$1.7 < N_{N4}$$
$$40 < v_{N4}$$

wherein the reference symbols are defined as follows:
$N_{Pi}$: mean value of refractive indices of the positive lenses arranged in the ith lens group
$N_{Ni}$: mean value of refractive indices of the negative lenses arranged in the ith leng group
$v_{Pi}$: mean value of Abbe's numbers of the positive lenses arranged in the ith lens group
$v_{Ni}$: mean value of Abbe's numbers of the negative lenses arranged in the ith lens group.

4. A wide magnification-variable range zoom lens system according to claim 3 where in said first lens group comprises at least a positive lens component which is a doublet consisting of a positive lens element and a negative lens element and said fifth lens group comprises at least two positive lens components at least one of which is a doublet consisting of a positive lens element and a negative lens element, said zoom lens system having the following numerical data:

| Dwg. No. | | R | D | nd | v |
|---|---|---|---|---|---|
| 1 | | 154.085 | 2.00 | 1.80518 | 25.4 |
| 2 | 1st lens | 71.160 | 7.00 | 1.62299 | 58.2 |
| 3 | group | −408.750 | 0.10 | | |
| 4 | | 50.885 | 4.50 | 1.62299 | 58.2 |
| 5 | | 82.750 | variable | | |
| 6 | | 133.870 | 1.20 | 1.77250 | 49.6 |
| 7 | | 17.125 | 6.44 | | |
| 8 | 2nd lens | −119.741 | 2.50 | 1.80518 | 25.4 |
| 9 | group | −37.040 | 1.00 | 1.77250 | 49.6 |
| 10 | | 73.977 | 0.10 | | |
| 11 | | 27.602 | 2.20 | 1.80518 | 25.4 |
| 12 | | 39.973 | variable | | |
| 13 | 3rd lens | 65.439 | 4.75 | 1.58913 | 61.1 |
| 14 | group | −20.400 | 1.00 | 1.80518 | 25.4 |
| 15 | | −29.765 | 0.10 | | |
| 16 | | 21.416 | 3.46 | 1.51633 | 64.1 |
| 17 | | 65.918 | variable | | |
| 18 | | 119.573 | 3.76 | 1.71736 | 29.5 |
| 19 | 4th lens | −17.128 | 1.00 | 1.77250 | 49.6 |
| 20 | group | 41.633 | 1.49 | | |
| 21 | | −34.680 | 1.00 | 1.77250 | 49.6 |
| 22 | | 140.021 | variable | | |
| 23 | | −129.801 | 4.95 | 1.71300 | 53.9 |
| 24 | | −16.485 | 1.00 | 1.80518 | 25.4 |
| 25 | 5th lens | −27.188 | 0.30 | | |
| 26 | group | −97.088 | 1.00 | 1.80610 | 40.9 |
| 27 | | 24.597 | 7.50 | 1.58913 | 61.1 |
| 28 | | −45.921 | 0.30 | | |
| 29 | | 42.314 | 4.16 | 1.51633 | 64.1 |
| 30 | | 312.792 | | | | wherein the reference symbols are defined as follows:
R represents radius of curvature on the lens surface
D designates the airspace between lens surfaces
nd denotes the refractive index for the d line
v represents the Abbe number.

5. A wide magnification-variable range zoom lens system according to claim 3 wherein said first lens group comprises at least a positive lens component which is a doublet consisting of a positive lens element and a negative lens element and said fifth lens group comprises at least two positive lens components at least one of which is a doublet consisting of a positive lens element and a negative lens element, said zoom lens system having the following numerical data:

| Dwg. No. | | R | D | nd | v |
|---|---|---|---|---|---|
| 1 | | 116.691 | 2.00 | 1.80518 | 25.4 |
| 2 | 1st lens | 61.756 | 7.60 | 1.62299 | 58.2 |
| 3 | group | 2363.005 | 0.10 | | |
| 4 | | 52.223 | 4.50 | 1.62299 | 58.2 |
| 5 | | 83.794 | variable | | |
| 6 | | 88.470 | 1.20 | 1.77250 | 49.6 |
| 7 | | 19.354 | 6.55 | | |
| 8 | 2nd lens | −94.460 | 2.80 | 1.80518 | 25.4 |
| 9 | group | −35.285 | 1.20 | 1.77250 | 49.6 |
| 10 | | 87.810 | 0.20 | | |
| 11 | | 33.119 | 2.40 | 1.80518 | 25.4 |
| 12 | | 40.708 | variable | | |
| 13 | | 55.135 | 4.00 | 1.58913 | 61.1 |
| 14 | 3rd lens | −36.777 | 1.00 | 1.80518 | 25.4 |
| 15 | group | −45.243 | 0.10 | | |
| 16 | | 25.142 | 3.80 | 1.51633 | 64.1 |
| 17 | | 756.094 | variable | | |
| 18 | | 458.443 | 3.00 | 1.71736 | 29.5 |
| 19 | 4th lens | −21.726 | 1.00 | 1.77250 | 49.6 |
| 20 | group | 54.509 | 1.25 | | |
| 21 | | −38.471 | 1.00 | 1.77250 | 49.6 |
| 22 | | 88.589 | variable | | |
| 23 | | −81.678 | 5.00 | 1.71300 | 53.9 |

-continued

| Dwg. No. | | R | D | nd | ν |
|---|---|---|---|---|---|
| 24 | | −16.168 | 1.00 | 1.80518 | 25.4 |
| 25 | 5th lens | −27.256 | 0.10 | | |
| 26 | group | −1253.462 | 1.00 | 1.80610 | 40.9 |
| 27 | | 24.851 | 7.00 | 1.58913 | 61.1 |
| 28 | | −66.642 | 0.10 | | |

-continued

| Dwg. No. | R | D | nd | ν |
|---|---|---|---|---|
| 29 | 41.868 | 7.00 | 1.51633 | 64.1 |
| 30 | 213.165 | | | | wherein the reference symbols are defined as follows:
R represents radius of curvature on the lens surface
D designates the airspace between lens surfaces
nd denotes the refractive index for the d line
ν represents the Abbe number.

* * * * *